J. S. HUSSEY.
EXTRACTING PARAFFIN FROM OILS.
APPLICATION FILED JAN. 22, 1917.
1,277,935.
Patented Sept. 3, 1918.
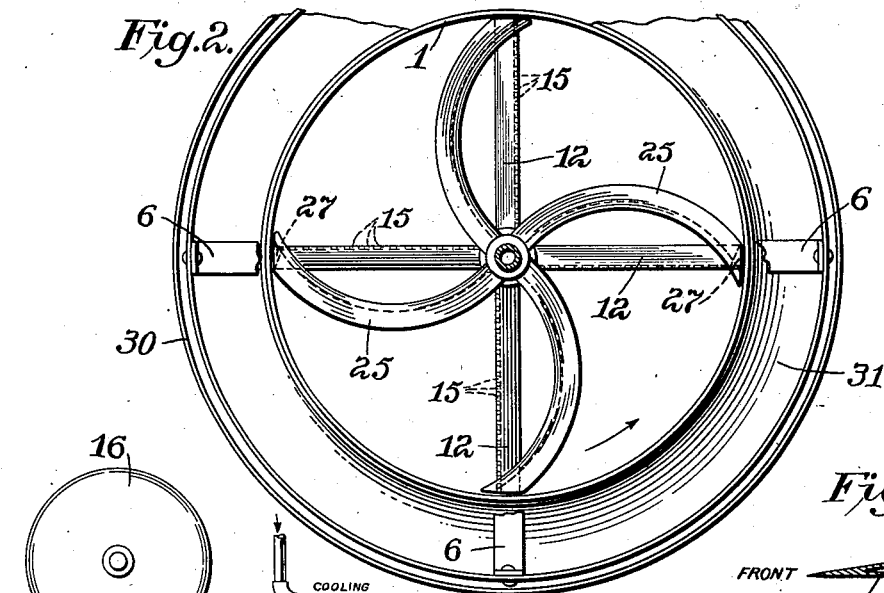
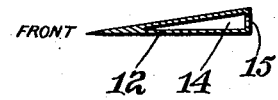
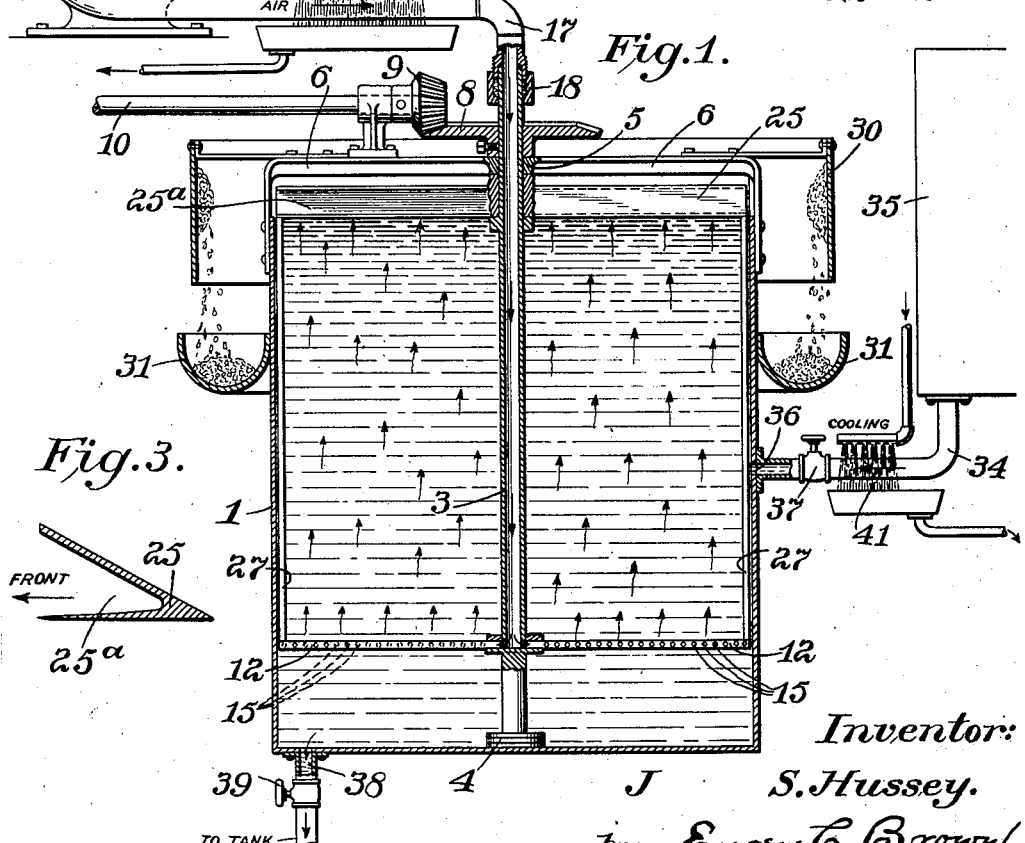
Inventor:
J. S. Hussey.
by Eugene C. Brown
Atty.

UNITED STATES PATENT OFFICE.

JOHN S. HUSSEY, OF MARTINEZ, CALIFORNIA.

EXTRACTING PARAFFIN FROM OILS.

1,277,935.  Specification of Letters Patent.  Patented Sept. 3, 1918.

Application filed January 22, 1917. Serial No. 143,660.

*To all whom it may concern:*

Be it known that I, JOHN S. HUSSEY, a citizen of the United States, residing at Martinez, in the county of Contra Costa and State of California, have invented certain new and useful Improvements in Extracting Paraffin from Oils, of which the following is a specification.

This invention relates to a method of extracting paraffin from mineral oils, or their distillates and apparatus for carrying out such process.

The usual method of removing paraffin is by means of refrigeration. The oil is cooled to approximately zero F. by pipes passing through the oil carrying ammonia or other refrigerant and connected with a refrigeration plant, thereby causing the paraffin to congeal or solidify though remaining distributed thoughout the body of oil. The oil containing the solidified paraffin wax is then transferred to a filter press in which the oil is expressed through filter canvases. Any oil remaining in the crude scale wax is mostly removed in the "sweat" rooms where the paraffin is maintained at a temperature below its melting point until the oil has run out.

This refrigeration process at a low temperature and the subsequent filtering of the oil in a semi-fluid state through canvas under 150 to 300 pounds pressure is expensive and slow and the presses must be cleaned of accumulated paraffin frequently.

It has further been proposed to reduce the temperature of the mineral oils by separating the oil into a finely divided state as by passing it through a rapidly rotating sieve in the form of a drum so that the oil in being thrown out therethrough by centrifugal force would be broken up into very minute particles, forming a mist; and then subjecting this oil spray or mist to a strong current of air which would so reduce the temperature of the oil particles that the paraffin congealed into the form of minute crystals would form with the oil a pasty mass. This method of cooling or refrigeration is not practical.

The object of my invention is to provide a method of separating the paraffin from mineral oils without the necessity for the present low temperatures and the filtering and in a manner which shall separate the paraffin from the oil in a condition ready for the "sweating" process.

My invention will be clearly understood from the following description in connection with the accompanying drawings, in which—Figure 1 is a vertical sectional view of an apparatus, embodying my invention and adapted to carry out my method; Fig. 2 is a top plan view of the same; Fig. 3 is a sectional view of the gathering paddle; and Fig. 4 is a sectional view of the air distributing blade.

I have shown the separating tank 1, provided with a hollow rotary shaft 3, having a lower bearing 4 and an upper bearing 5, suitably supported by brace arms 6, and connected by gearing 8, 9 with a power shaft 10. A plurality of hollow arms 12, are carried by the shaft 3 adjacent its lower end and have their channels 14, in communication with the bore of the shaft. These arms are preferably wedge-shape, as shown in Fig. 4, having a sharp thin forward edge and the rear edge being provided with a series of apertures 15. The upper end of the hollow shaft is connected with a blower 16 or other source of compressed air, by means of a pipe 17, having a stuffing box connection 18. Inasmuch as the air is heated during compression I may provide a cooling means such as jets of water 20, from a suitable source, discharging upon the pipe 17.

A number of blades or arms 25, are secured to the upper end of the shaft 3, and which are preferably curved in the manner shown and shaped in cross-section as illustrated in Fig. 3. These arms may be mounted so that they rotate with their lower front edge slightly above or on a level with the top of the tank 1. Scrapers 27, which are preferably very thin, having a front knife edge are secured at their ends to the arms 25 and 12, respectively and travel in close proximity to the inner vertical wall of the tank. By reason of their thinness they offer very litle resistance and are kept clean by their passage through the oil. An annular shield or curtain 30, extending above and below the upper edge of the tank, serves to catch the particles of paraffin and direct them into a trough or basin 31.

The tank is supplied with oil at a point or points above the air distributing blades 12, by means of one or more pipes 34, connected with a supply tank 35 or other source of oil supply.

Having now described the apparatus which I have shown for illustrative purposes I will state the manner in which it may be used to carry out my method. I have discovered that the paraffin contained in mineral oils may be separated therefrom at temperatures higher than those usually employed by subjecting a body of the oil to a process of aeration so that the crystals or particles of paraffin will entrap air bubbles and be carried by flotation to the surface of the oil where it may be skimmed or brushed off.

The flow of oil entering at 36, is regulated by means of the valve 37, and the outlet 38 is regulated by the valve 39, so that the tank is maintained at a definite level. A constant stream of air bubbles issuing from the apertures 15 in the rotating blades or arms 12, pass upward through every part of the tank and thoroughly aerate the oil. I have found that the effect of this aeration by an enormous number of air bubbles thoroughly distributed throughout the entire body of oil, is to cause the paraffin to entrap the air bubbles so that a honeycombed mass of wax and air is formed which is carried upwardly to the surface of the oil. The floating mass is gathered by the blades 25, and is held in the angular recess 25ª until the centrifugal action causes it to be moved outwardly along the rearwardly curving surface and thrown over the edge of the tank where it is caught by the apron 30 and directed into the trough 31, from which it may be removed to the sweat room or other disposition made of it. The trough 31 may be connected with a chute leading directly to the sweat room or other desired place. The inner walls of the tank are kept free from paraffin by the rotating scrapers 27.

Inasmuch as the inlet 36 for the oil is above the air distributing blades 12, and the outlet 38 is below said blades, all of the oil is subjected to a thorough aeration and the paraffin is separated and carried upwardly by the buoyant action of the air bubbles before the oil reaches the lower part of the tank where it is discharged.

Inasmuch as the air coming from the compressor 16, is heated to a certain extent, it is preferable to provide some means of cooling it. For this purpose I have shown the pipe 17 passing through jets of water 20. Again during the hottest season it is desirable to cool the incoming oil and I have, therefore, shown the pipe 34 passing through jets of water 41.

While I have described in detail the construction shown in the drawings of an apparatus which I have devised for the purpose of carrying out my method of separating paraffin from oils, it will be evident to engineers that various changes can be made therein and also that other apparatus may be employed to carry out my method disclosed herein within the spirit of my invention and without in any manner departing from the scope of my claims I have shown the air introduced into the body of oil by means of perforated hollow arms or blades which are rotated in the liquid, but it is not absolutely necessary that the air distributing apparatus shall be rotated, it being merely essential that the air bubbles shall be introduced throughout the body of the liquid so that all of the oil may be subjected to the action of the air bubbles. Again it is not absolutely necessary that the paraffin which is raised to the surface by a process of flotation shall be gathered by means of rotating blades. Thus the body of oil could be made to move from the inlet toward the outlet after having been subjected to aeration and the floating mass of paraffin scale wax could be removed by a stationary gathering blade under which the body of oil moved in passing to the outlet. Other modifications will suggest themselves to appreciate the foregoing disclosure.

I claim:—

1. The process of separating paraffin from mineral oil, which comprises the introduction of jets of air into the body of oil thereby causing the oil to be permeated with air bubbles, resulting in the agglomeration of the paraffin into small masses about the entrapped air bubbles and which causes said paraffin to rise to the surface, and gathering the resulting floating masses of paraffin from the surface of the oil.

2. The process of separating paraffin from mineral oil, which comprises the introduction of oil into a container, causing air bubbles to be distributed throughout the body of the oil to thereby separate paraffin in clustered masses with the bubbles enmeshed, removing the paraffin which is carried to the surface of the oil by the buoyant action of the enmeshed air, and withdrawing the oil from the container.

3. The process of separating paraffin from mineral oil, which comprises introducing a continuous stream of oil into a container below the top thereof, withdrawing the oil from a point below the point of introduction, the rates of introduction and withdrawal being substantially the same, introducing jets of air throughout the body of oil at a point intermediate the points of introduction and withdrawal, and removing the paraffin carried to the surface thereof.

4. Apparatus for separating the contained paraffin from mineral oils, comprising a tank or container, means for introducing oil therein, means for withdrawing oil therefrom, and means for introducing jets of air throughout the body of oil intermediate the points of introduction and withdrawal.

5. Apparatus for separating the contained paraffin from mineral oils, comprising a tank or container, means for introducing oil therein, means for withdrawing oil therefrom, means for introducing jets of air throughout the body of oil intermediate the points of introduction and withdrawal, and means for removing the paraffin separated and brought to the surface by the action of said jets of air.

6. Apparatus for separating the contained paraffin from mineral oils, comprising a tank or container provided with inlet and outlet connections, a hollow rotary member provided with a plurality of discharge openings, means for connecting said member with an air supply, a skimming or gathering device revolubly mounted adjacent the top of said tank, and means for rotating said hollow member and said gathering device.

7. Apparatus for separating the contained paraffin from mineral oils, comprising a tank or container provided with inlet and outlet connections, a hollow rotary member provided with a plurality of discharge openings located between said connections, means for connecting said member with an air supply, means for cooling the air supplied to said hollow member, a skimming or gathering device revolubly mounted adjacent the top of said tank, and means for rotating said hollow member and said gathering device.

8. Apparatus for separating the contained paraffin from mineral oils, comprising a tank or container, a hollow shaft rotarily mounted therein, a hollow arm carried by said shaft, and having its bore connected with the bore of the shaft and provided with a plurality of openings, means for connecting said hollow shaft with an air supply, and a skimming or gathering arm secured to said shaft adjacent the top of the tank and adapted to remove floating paraffin from the surface of the oil.

In testimony whereof I affix my signature.

JOHN S. HUSSEY.